United States Patent
Baumsteiger

(10) Patent No.: US 6,374,775 B1
(45) Date of Patent: Apr. 23, 2002

(54) KENNEL STROLLER

(76) Inventor: Norma Baumsteiger, 2 East Ter., Tiburon, CA (US) 94920

( * ) Notice: Subject to any disclaimer, the term of this patent is extended or adjusted under 35 U.S.C. 154(b) by 23 days.

(21) Appl. No.: 09/131,156

(22) Filed: Aug. 7, 1998

(51) Int. Cl.[7] ................................................. A01K 1/00
(52) U.S. Cl. ....................... 119/496; 119/498; 119/499; 280/47.38
(58) Field of Search ................................. 119/452, 453, 119/496, 497, 499, 498; 280/47.38, 639, 650, 47.26, 47.17, 47.19; D12/129

(56) References Cited

U.S. PATENT DOCUMENTS

| | | | | |
|---|---|---|---|---|
| 2,790,414 A | * | 4/1957 | Rossow | 119/496 |
| 2,821,165 A | * | 1/1958 | Wright | 119/496 |
| 3,490,417 A | * | 1/1970 | Swinney | 119/496 |
| 3,710,761 A | * | 1/1973 | Gregory | 119/496 |
| D258,816 S | * | 4/1981 | Headley et al. | D12/129 |
| 5,113,793 A | * | 5/1992 | Leader et al. | 119/453 |
| D330,528 S | * | 10/1992 | Allen et al. | D12/129 |
| 5,288,098 A | * | 2/1994 | Shamie | 280/642 |
| 5,357,900 A | * | 10/1994 | Ho | 119/479 |
| 5,701,843 A | * | 12/1997 | Lazides | 119/496 |
| 5,832,874 A | * | 11/1998 | Ravin | 119/496 |

FOREIGN PATENT DOCUMENTS

| | | | |
|---|---|---|---|
| WO | 9908919 | * | 2/1999 |

OTHER PUBLICATIONS

Style No. 36105BX, Kolcraft Enterprises, Chicago, Illinois.
"Deluxe Vari Kennel Jr.", Doskocil Mfg. Co., Arlington, Texas.

* cited by examiner

*Primary Examiner*—Charles T. Jordan
*Assistant Examiner*—Judith A. Nelson
(74) *Attorney, Agent, or Firm*—Thomas M Freiburger

(57) ABSTRACT

A kennel stroller affords safe, convenient and comfortable transport of small pets. The stroller is designed to receive both in-cabin kennels or ordinary baggage check-in kennels which are placed in areas specified for live animals on airlines. A foldable stroller of the type used for baby strollers is slightly modified to provide an internal open volume sufficient to receive the portable kennel. Retained to the stroller frame by a strap or other fastener, the kennel can be used as an open pet bed, without cover, or as a covered, complete kennel.

11 Claims, 2 Drawing Sheets

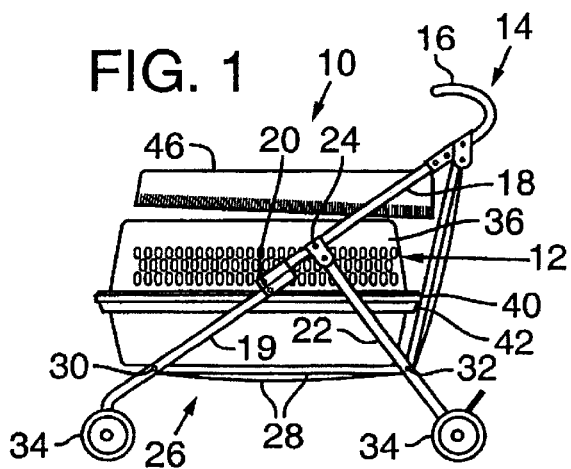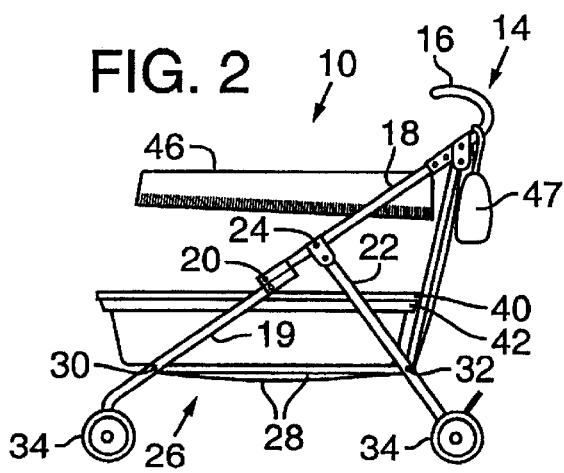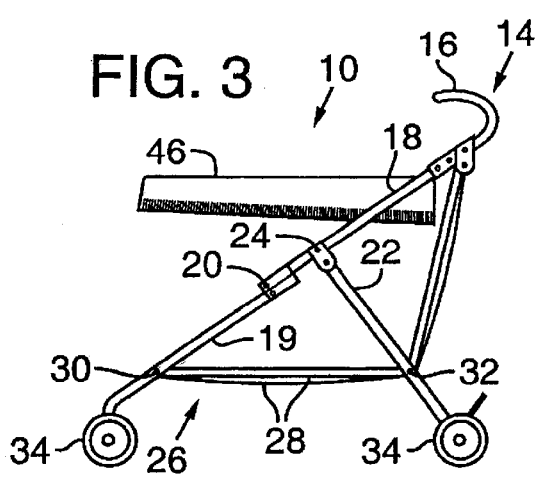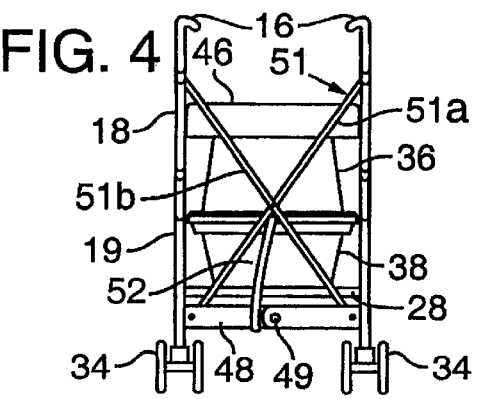

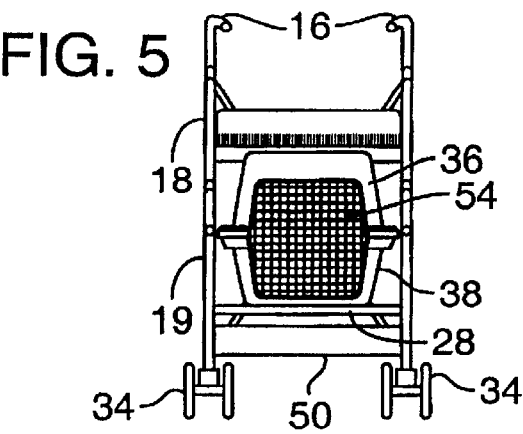
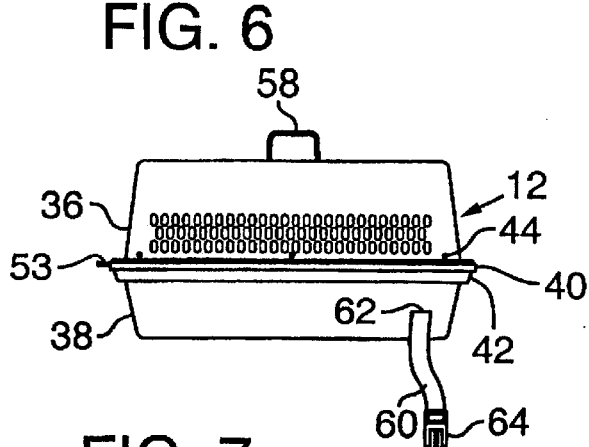
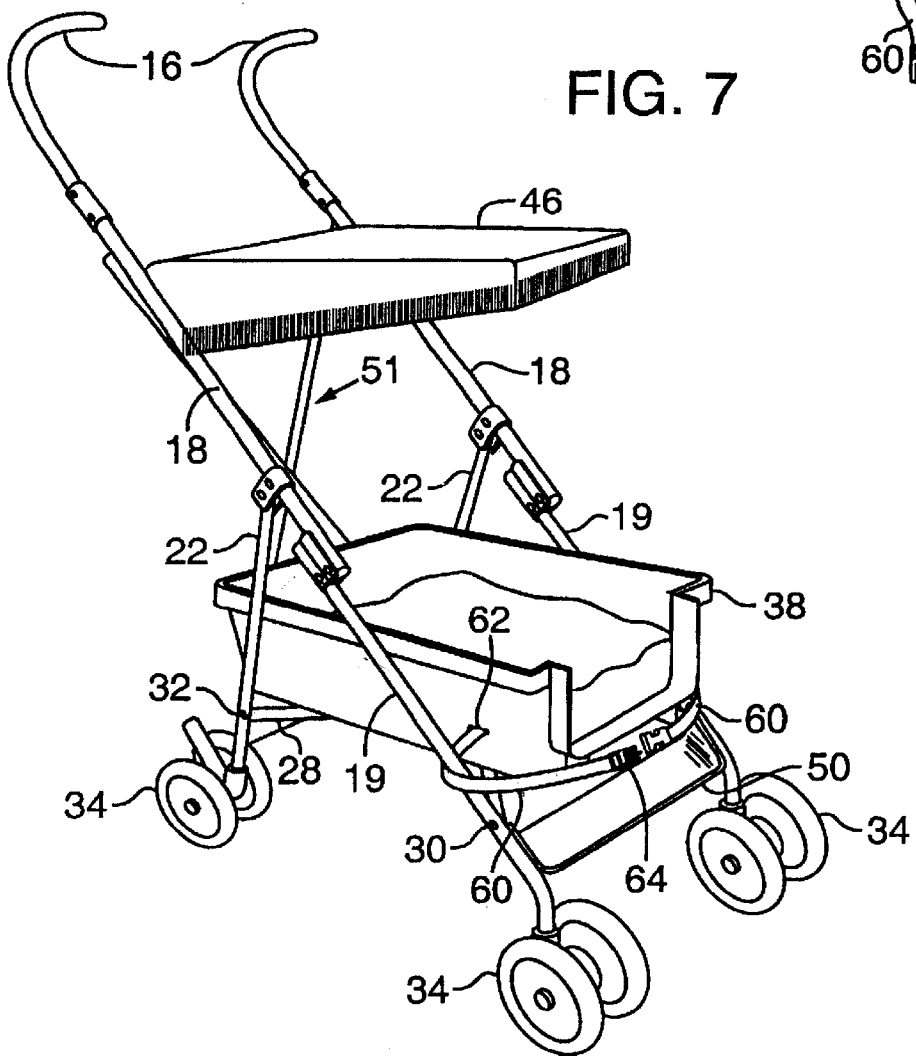

KENNEL STROLLER

BACKGROUND OF THE INVENTION

The invention concerns a pet carrier in the form of an efficient and convenient stroller.

Many owners of small pets, especially mini-breed dogs, find difficulty traveling with their pets. Small pets are not able to walk long distances, are bothered by hot and cold weather, are harassed by larger dogs and mischievous children and often are not seen by people who may unintentionally step on them.

Owners resort to carrying their pets to protect them. Carrying even small pets for any length of time becomes tiresome and puts both the owner and pet under stress. A sensible solution to these problems is to transport the pet in a safe and comfortable carrier which is designed for the maximum convenience of the owner.

Senior pet owners often are reluctant to walk with their small pets for fear of falling or having their pets molested by other unleashed dogs or by unruly children. The kennel stroller of the invention affords these senior pet owners security and motivation to take their pets traveling or strolling. Pets who may be elderly, deaf, blind or unable to walk can enjoy the safety and comfort of an excursion with their owner when in the kennel stroller.

SUMMARY OF THE INVENTION

The present invention is a kennel stroller for small pets, making travel convenient for both pets and their owners. The kennel stroller is designed to carry small pets, preferably about 15 pounds and under, in either an open travel bed or a closed kennel, attached to and held safely within the frame of a stroller. The stroller and kennel combination enables pet owners to transport their pets on short daily excursions or on long distance travels, on domestic or overseas carriers. The kennel, which can be configured as either a closed secure carrier or an open travel bed, can be quickly detached from the stroller frame.

In the open travel bed mode, the pet is restrained by means of a safety strap which attaches to the pet's collar or harness ring. The stroller preferably has a folding sun-shade or canopy and a carry-all bag which quickly detaches from the stroller handles. Both back wheels are fitted with foot brakes and the front wheels swivel 360° for easy turning. In a preferred embodiment the stroller with kennel, pad, carry-all bag and canopy weighs only 16 lbs. As in prior foldable baby strollers, the stroller portion folds completely for compact storage and is made of durable lightweight, washable materials.

It is thus among the objects of the invention to provide for more convenient, safe and comfortable pet travel, with comfort to both the pet and the owner, while providing for separate use of the kennel portion of the kennel stroller when desired, and for folded, compact storage of the stroller portion, all in a very lightweight system. These and other objects, advantages and features of the invention will be apparent from the following description of a preferred embodiment, considered along with the accompanying drawings.

DESCRIPTION OF THE DRAWINGS

FIG. 1 is a side view of a kennel stroller of the invention with a vented, closed kennel shown in a foldable stroller frame.

FIG. 2 is a side view similar to FIG. 1, but with the kennel stroller shown in a travel-bed mode, with the top half of kennel removed.

FIG. 3 is a side view similar to FIG. 1, with the kennel removed and showing the folding stroller frame and canopy.

FIG. 4 is a rear elevation view of the kennel stroller, showing a closed kennel in the stroller.

FIG. 5 is a front elevation view, showing the kennel with a spring loaded detachable front gate in place.

FIG. 6 shows the closed kennel removed from the stroller frame for separate use, and indicating a handle and fasteners which release to remove the upper half of the kennel.

FIG. 7 is a perspective view showing the kennel stroller combination, in the travel-bed mode.

DESCRIPTION OF PREFERRED EMBODIMENTS

FIG. 1 shows a kennel stroller 10, comprising a combination pet kennel and stroller. FIG. 7 shows the kennel stroller in perspective, in travel-bed mode. As can be seen from FIG. 1 and the other drawings, the kennel stroller includes a kennel portion 12 and a stroller portion 14, the stroller portion preferably comprising a foldable stroller which folds up into a compact carrying configuration, well known and in common use. One example is a stroller marketed by Kolcraft Enterprises of Chicago, Ill., under Style No. 36105BX. In the combination kennel-stroller of the present invention, a folding frame strut member of a stroller such as the particular model listed above has been removed, as has the baby chair, so that the animal kennel 12 can fit within the stroller frame.

FIG. 1, and especially FIG. 3, show the generally configuration of the stroller frame 14. As is typical of such compactly folding strollers, the stroller frame 14 has a pair of handles 16 at the upper rear, rigidly secured to a pair of upper angled frame members 18. These frame members 18 connect to lower angled frame members 19 via pivots 20. A pair of frame struts 22 are connected by pivots 24 to the upper angled frame members 18 just upward and aft of the pivot connections 20, as shown. The frame 14 includes a horizontal base frame 26 which is comprised of a pair of frame bars pivoted together essentially at their centers in an "X" configuration. This "X" configuration is partially visible in FIGS. 1–3 and 7 where parts of the two horizontal frame bars 28 are visible. The frame bars 28 are connected at a pair of forward support points 30 and a pair of rear support points 32, in connections which allow both closure of the two sides of the stroller together in a scissor action at the base frame 26 and also upward swinging motion of the front end of the stroller for final folding, in which the pivot connections 20 swing downwardly.

Wheels 34, preferably double pairs of wheels as shown and as typical of these types of strollers, are secured at each of the four support points 30 and 32.

As noted above, the kennel stroller combination of the invention involves a modified stroller frame 14 wherein a cross member or struts (not shown) have been removed from the lower angled frame members 19, to form an open volume of space in the erected stroller that accommodates the pet kennel 12. This modification does not weaken the stroller in any significant manner, since the purpose of these members was to support the fabric seat for the baby in the typical stroller.

FIGS. 1 and 2 show the kennel stroller in alternate forms, with the fully closed and secure pet kennel 12, with a ventilated cover 36, in FIG. 1; and with only the lower half or base section 38 of the kennel used in FIG. 2, in an animal travel bed mode. The cover 36 secures together with the base section 38 in a manner typical of portable kennels, which may be by fasteners which extend through peripheral lips 40 and 42 of the upper and lower kennel sections. These fasteners 44 are indicated in FIG. 6. In the travel bed mode the animal can be retained by a strap secured to the animal's collar and to the rear of travel bed (base section 38).

The drawings also show a canopy 46 secured to the stroller frame near upper ends of the upper angled frame members 18, again in a manner conventional in such foldable strollers. The canopy 46 is configured to collapse together when the two sides of the stroller frame are brought together. When the frame is fully folded to its most compact configuration, the canopy is collapsed and folded into the frame. As in previous foldable baby strollers, the canopy advantageously can be made of a light cotton fabric attached to a pivoting or folding X-shaped support frame. The folding support member (not shown) is attached to the frame members 18, just below the handles 16, so that it can be swung up, back and around to the back side of the stroller frame when folded for storage, as in the particular stroller model referenced above. A carry bag 47 for accessories may hang from one or both of the frame handles 47 as shown in FIG. 2.

The rear and front elevation views of FIGS. 4 and 5 show a rear transverse strut frame member 48 and a front transverse folding vinyl strap member 50. The rear strut frame member 48 has a center pivot 49 to allow this member to fold in with the pivot point 49 moving upwardly, initiated by an upward pushing with one's foot. The vinyl strap 50 (FIG. 5) at the front of the stroller simply folds when the stroller collapses. FIG. 4 shows another, rear "X" frame 51 formed of bars 51a and 51b, as in the manufactured stroller referenced above.

Thus, the drawings show that the animal kennel 12 is supported on the "X" shaped base frame 26 (comprising frame bars 28). Preferably the kennel 12 is secured in some suitable manner to the stroller frame, such as by an elastic or bungee cord 52 (FIG. 4) hooked to the back of the kennel, such as to a hole provided in a tab 53 which extends slightly back from the lower kennel section's lip 42 (FIG. 6), such a tab and hole being provided in an available portable kennel as referenced below. FIG. 4 shows, not in great detail, the bungee cord 52 hooked to the back of the lower kennel section and extending down around the rear frame member 48, beyond which the bungee 52 is secured at its other end to the "X" frame 26 at the bottom of the stroller, preferably to a pivot joint, between the two members 28 (connection not shown). The bungee cord 52 is removed to take the kennel out of the stroller, and can be used to secure the collapsed stroller members.

FIG. 5, a front view, shows the kennel with closed gate 54, which may be similar to gates provided with portable pet kennels of the general type shown. The gate is removable. The gate 54 and the upper portion of the kennel 12 can be stored away when the kennel is used as an open travel bed. The gate 54 is quickly attached to upper and lower portions of the kennel 12 by means of a spring latch (not shown), typical of kennels such as referenced below.

FIG. 6 shows the animal kennel 12 as removed from the stroller frame. A handle 58 is secured to the top cover portion 36 for carrying the kennel and pet when separated from the stroller.

FIG. 7 shows a further means by which the kennel 12 (in this case, only the lower section 38) is retained within the stroller. A strap 60, comprised of left and right sections, is secured to the sides of the kennel section 38, near the front end, bypassing through slits 62, with a buckle or other large end feature of the strap trapped on the inside of the slit at each side. The strap is fitted with a quickly releasable buckle device 64 of the common type which has springable barb-like latch elements which are forced together slightly when the buckle is pushed into the receiving portion of the buckle on the other strap. A part of the buckle 62 is also shown in FIG. 6. As shown in FIG. 7, this strap passes from the slits 62 out and around the lower angled frame members 19 to be snapped together, thereby securely retaining the kennel on the stroller frame.

One important aspect of the invention is the use of a conventional pet kennel 12 with a conventional (but slightly modified) folding stroller 14. An available conventional kennel, suitable for animals up to about 15 lbs., is marketed by Doskocil Mfg. Co. Of Arlington, Tex., under the product name Deluxe Vari Kennel Jr. This portable kennel has a width dimension (preferably about 12 inches) which closely fits within the interior space of the kennel frame defined between the left and right frame members 18, 19 and 22. The fit between these two main components of the invention provides for maximizing the space available to the pet while minimizing the overall size of the kennel stroller and minimizing total weight, which is very important for portability and air travel usage. The weight of the kennel referenced above is about 3 pounds (1½ pounds each for top and bottom sections), and of the stroller referenced above, about 7 pounds. A pad in the kennel may be about ½ pound. Thus, the total weight of the kennel stroller in one preferred embodiment is about 10 to 10½ pounds, or 8½ to 9 pounds in travel bed mode. It is preferable that the weight of the kennel stroller be kept under about 12 pounds.

However, the size of both the kennel and the stroller frame may be larger, with the kennel fitting preferably closely within the stroller frame.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In combination, a folding stroller of the type which has two front and two rear support points, with at least one wheel mounted on a structural member at each of the four support points, and which has a frame comprised of a left side and a right side and including a series of structural frame members including base frame members and side frame members which are pivotally connected together to be erected as the stroller and which permit folding together into a compact configuration for carrying or storage when the stroller is not in use, including pivot joints in the frame permitting collapsing of the left and right sides inwardly toward each other and compactly together and then permitting pivoting of frame members within a plane generally longitudinal relative to the stroller such that left and right side frame members pivot in unison until a compact essentially linear configuration results with front support points of the stroller generally at one end and rear support points generally at an opposite end, and a pet kennel, the combination comprising:

the stroller frame when erected defining an internal space which is open at the front of the stroller and free of any transverse frame members, the pet kennel having a bottom, two side walls and at least one end wall and having a width which fits between side frame members of the erected stroller, and the bottom of the pet kennel being sized to fit and rest on the base frame members, which are generally horizontal in the erected stroller and just above the wheels, and quick release connection means for allowing fast and easy removal of the pet kennel from the stroller.

2. The combination of claim 1, wherein the pet kennel comprises upper and lower sections with means for releasably securing the sections together, whereby the upper section of the pet kennel can be removed from the lower section when desired and the lower section placed in the stroller to provide an open-topped travel bed for a pet.

3. The combination of claim 1, wherein the quick release connection means comprises a strap secured to the pet kennel near its front end, the strap comprising two strap sections, each extending around a side frame member of the stroller and then secured together, so as to secure the kennel in position in the stroller.

4. The combination of claim 3, further including an elastic, stretchable strap member securing the rear of the kennel to a rear bottom frame member.

5. The combination of claim 3, wherein the kennel has two narrow slotted openings in the side-walls, near the front of the kennel, and the two strap sections passing through the slotted openings, with enlarged inner ends on the straps to prevent the straps from pulling through the slotted openings.

6. The combination of claim 1, wherein the pet kennel and stroller together have a weight not exceeding 12 pounds.

7. The combination of claim 1, wherein the pet kennel and stroller together have a weight not exceeding about 10 pounds.

8. The combination of claim 1, wherein the pet kennel comprises upper and lower sections releasably secured together, with a front opening for ingress or egress of a pet, and wherein the kennel is about 12 inches in width, fitting closely between the side frame members of the stroller.

9. The combination of claim 8, wherein the pet kennel has a weight not exceeding about 3 pounds.

10. A method for strolling a pet in a comfortable and secure condition, comprising:

providing a folding stroller of the type which has two front and two rear support points, with at least one wheel mounted on a structural member at each of the four support points, and which has a frame comprised of a left side and a right side and including a series of structural frame members including base frame members and side frame members which are pivotally connected together to be erected as the stroller and which permit folding together into a compact configuration for carrying or storage when the stroller is not in use, including pivot joints in the frame permitting collapsing of the left and right sides compactly together followed by pivoting of frame members within a plane generally longitudinal relative to the stroller such that left and right side frame members pivot in unison until a compact essentially linear configuration results with front support points generally at one end and rear support points generally at an opposite end, the stroller frame when erected defining an internal space which is open at the front of the stroller and free of any transverse frame members, unfolding and erecting the stroller, placing into the internal space of the erected stroller a pet kennel having at least a bottom, two side walls and one end wall and having a width which fits between side frame members of the erected stroller, such that the bottom of the pet kennel rests on the base frame members, which are generally horizontal in the erected stroller, securing the pet kennel to the stroller frame using a quick release connection means, and placing a pet in the kennel and pushing the stroller.

11. The method of claim 10, wherein the pet kennel includes a base section and an upper section, the two sections being releasably secured together, with a pet ingress/egress opening at the front of the kennel, whereby the upper section of the pet kennel can be removed from the lower section and the lower section placed in the stroller to provide an open-topped travel bed for a pet.

* * * * *